(12) United States Patent
Boyce et al.

(10) Patent No.: US 6,280,176 B1
(45) Date of Patent: Aug. 28, 2001

(54) VENT TUBE SYSTEM

(75) Inventors: Alden C. Boyce; James Kenneth Reash, both of Akron, OH (US)

(73) Assignee: Wheeler Boyce Co., Stow, OH (US)

( * ) Notice: Subject to any disclaimer, the term of this patent is extended or adjusted under 35 U.S.C. 154(b) by 0 days.

(21) Appl. No.: 09/348,203

(22) Filed: Jul. 8, 1999

(51) Int. Cl.[7] .................................................. B29C 33/010
(52) U.S. Cl. ........................ 425/546; 425/401; 425/420; 425/812; 249/141
(58) Field of Search ................................... 425/420, 401, 425/546, 812, 84, 85; 249/141

(56) References Cited

U.S. PATENT DOCUMENTS

| | | | |
|---|---|---|---|
| 3,839,901 | * 10/1974 | Finkle et al. | 73/54 |
| 3,969,475 | 7/1976 | Horiuchi et al. | 264/310 |
| 4,342,730 | * 8/1982 | Perrotta | 423/215.5 |
| 4,436,497 | 3/1984 | Dahl et al. | 425/28.1 |
| 4,605,395 | * 8/1986 | Rose et al. | 694/9 |
| 4,740,145 | 4/1988 | Shurman | 425/28.1 |
| 4,741,515 | * 5/1988 | Sharma et al. | 266/266 |
| 4,795,331 | 1/1989 | Cain et al. | 425/28.1 |
| 4,946,363 | 8/1990 | Cavender | 425/4 R |
| 5,076,912 | * 12/1991 | Belz et al. | 210/94 |
| 5,322,625 | * 6/1994 | Rise | 210/238 |
| 5,380,183 | 1/1995 | Piazza et al. | 425/434 |
| 5,482,721 | 1/1996 | Clark et al. | 425/4 R |
| 5,522,808 | * 6/1996 | Skalla | 604/319 |
| 5,629,965 | * 5/1997 | Soga et al. | 376/327 |
| 5,741,450 | 4/1998 | Monroe | 264/102 |
| 5,811,004 | * 9/1998 | Robertson | 210/482 |

* cited by examiner

*Primary Examiner*—Nam Nguyen
*Assistant Examiner*—Joseph S Del Sole

(57) ABSTRACT

A vent tube assembly is disclosed for use in a vent hole commonly found in metal molds which are used to produce, by rotational molding processes, a wide variety of plastic goods. The main body of the vent tube assembly is produced from a heat resistant, thermoplastic composition. Preferably, the composition will be polyetheretherketone (PEEK). The vent tube assembly resembles a probe-like rod comprising: a large diameter annular top section; an annular mid-section that is substantially smaller in diameter than the annular top section; and an annular bottom section that is slightly smaller in diameter than the annular mid-section and that terminates in with a rounded innermost tip. An elongated central bore is provided through the vent tube assembly. The central bore, along with a counterbore located near the top of the annular top section, provides an air escape passageway. The passageway fluidly communicates with the interior of the mold via a plurality of pore-like holes situated near the innermost tip. To help prevent loss of plastic raw material through the vent tube as the mold rotates, a plurality of beads is included within the length of the passageway that extends through the annular bottom section. The beads are kept in the tube by a perforated top disk and a retaining clip. A principal advantage provided by the vent tube system over conventional systems is elimination of the need to service the vent tube by cleaning and repacking it after every curing cycle.

18 Claims, 1 Drawing Sheet

VENT TUBE SYSTEM

FIELD OF THE INVENTION

The present invention relates generally to a vent tube that permits hot gas to escape from a mold used to produce an object from an elastomeric substance, and more specifically, a vent tube assembly for use in a vent hole commonly found in metal molds which are used to produce plastic goods by known rotational molding processes.

BACKGROUND OF THE INVENTION

A seemingly endless variety of plastic goods is manufactured through the use of known rotational molding equipment and processes. Very generally, such goods frequently are produced on a turret-like apparatus having a multiplicity of axially rotatable arms each of which extends radially outward from the central body of the apparatus and receives at the outermost arm end a removable cast and/or machined hollow matrix for shaping a plastic compound into a useful object. The arms of the turret-like apparatus and the molds attached thereto also rotate in a horizontal plane about the central vertical axis of the turret apparatus and in a sequential manner through a variety of process stations which are located circumferentially thereabout. The stations typically encountered include a loading station, an oven station, a holding station, a cooling station and an unloading station. At the loading station, a mold equipped with a vent tube and containing an elastomeric substance is attached to one of the radially extending arms of the turret-like apparatus. At the oven station, the mold is received and maintained for a predetermined time within a chamber where heat energy is transferred to the mold while the mold is simultaneously caused to rotate as a result of axial rotary movement imparted to the turret arm by the turret apparatus. During the time that the mold is within the oven chamber, air within the cavity of the mold heats and expands, creating increased pressure which traditionally has been kept below a desired maximum level by allowing a portion of the heated air to escape through the mold vent tube. Once the curing operation has been completed, the mold is removed from the oven station and rotatably advanced either to the holding station or to the cooling station. After the mold and the object produced therein have undergone sufficient cooling, the mold is further advanced to the unloading station where the mold is opened and the cured object is removed therefrom. The molding process may then be repeated to produce another object after a new supply of elastomeric material is introduced into the mold.

The vent tubes which have been used with the above described molding equipment and processes have generally been very simple and inexpensive structures. In virtually all instances, they have been comprised of a generally straight piece of pipe-like conduit being open at each of its ends and further being axially unobstructed over its entire interior length. The vent tubes traditionally been made from a heat resistant material which can withstand the heat energy transferred to them not only from the hot gas that escapes the mold cavity, but also from the mold itself and from the heat transfer medium contained within the oven chamber. While a number of heat resistant materials have proven suitable over the years, the preferred material of late has been polytetrafluoroethylene (PTFE).

Aside from being simple, straight pieces of PTFE conduit, known vent tubes also have been created by machining a length of PTFE conduit so that it will have various external and internal wall surface features. One such tube has a constant diameter internal bore and a dual-diameter outer wall surface. The larger diameter outer wall surface extends over the length of the tube that makes contact with that portion of the mold body defining the orifice into which the vent tube is inserted and that is exposed to the heat transfer medium of the oven chamber. The larger diameter outer wall surface also includes at its midsection a flange that extends radially outward and serves as a ring-like stop to limit movement of the vent tube into the mold body. Another such tube has an external wall surface that consists of three distinct regions. The first region is one that begins at the outermost end of the tube, i.e., the tube end that is exposed to the oven chamber, and terminates at a point along the tube periphery that adjoins the entrance to the vent tube orifice of the mold. The first region has a diameter that is constant throughout and that is larger than the diameter of the vent tube orifice of the mold. The second region immediately adjoins the first region and extends inwardly toward the interior cavity of the mold for a distance that is substantially equivalent to the thickness of the mold wall at the vent tube orifice. Since the second region is smaller in diameter than the first region, a step-like flange is formed at the junction of the two regions. In a manner similar to that of the ring-like stop provided on the other of the above described machined vent tubes, the step-like flange also functions to limit movement of the vent tube into the mold body. The third region extends directly from the second region and into the mold cavity. The diameter of the third region gradually decreases from that of the second region where the second and third regions meet one another to a slightly lesser diameter at the innermost end of the vent tube. This gradual diameter decrease provides the third region with a gently tapered exterior surface when it is viewed from the side. Like the other machined vent tube described hereinabove, the second machined tube has a internal bore with a uniform internal diameter. The interior bore may be provided with a circumferentially threaded region that extends from the outermost end of the tube inwardly within the first region for a distance substantially equal to the first region's length. The circumferentially threaded region serves as a means to couple an air supply line to the vent tube and to thereby provide an external air source for pressurizing the interior of the mold during the curing cycle. Typically, pressurization is 1 psi or less.

Traditionally, mold vent tubes of the type just described are provided with a quantity of woven or matted material such as steel wool or fiber glass which is inserted into the interior bore of the vent. Such material serves a dual purpose. First, it provides a barrier to help prevent loss of the elastomeric substance from the mold cavity during the molding process. And second, it permits outward flow of hot gas from the mold cavity.

The known vent tubes so equipped with steel wool or fiber glass have functioned satisfactorily for their intended purpose; however, one of the drawbacks associated with the use of such tubes is the need to service them at the end of each curing cycle. Typically servicing entails manually removing, cleaning, repacking and reinserting them into the mold. These tasks are made necessary, because during the curing cycle a small amount of the elastomeric substance flows from the mold cavity into the vent tube and becomes entrapped in the steel wool or fiber glass. Even though the amount of elastomeric substance that becomes entrapped is small, it causes enough clogging of the steel wool or fiber glass to prevent further passage of hot gas during the next cure cycle in a volume that will avoid the occurrence of molding defects in the object being formed by the mold.

Servicing of the conventional vent tubes has typically been done by a worker who loads and unloads each of the molds before and after each curing operation. As may be expected, such servicing adds to production time, thereby reducing productivity. It also increases overall production cost due to the additional labor required.

In view of the foregoing, it should be evident that a need exists for a vent tube assembly which does not need to be serviced after each curing cycle. Therefore, it is an object of the present invention to provide a new and useful rotational mold vent tube assembly which may be used for a substantial number of curing cycles before the assembly must be removed from the mold and serviced.

It is also an object of the present invention to provide a new and useful rotational mold vent tube assembly that will increase manufacturing productivity by shortening the time required to ready a mold for use and begin a new curing cycle.

It is a further object of the present invention to provide a new and useful rotational mold vent tube assembly that will reduce overall labor costs.

It is yet a further object of the present invention to provide a new and useful rotational mold vent tube assembly comprised of a material that will make the assembly more heat resistant and durable.

SUMMARY OF THE INVENTION

The present invention is a vent tube assembly for use in a vent hole commonly found in metal molds which are used to produce, by rotational molding processes, a wide variety of plastic goods. The main body of the vent tube assembly is produced from a heat resistant, thermoplastic composition. Preferably, the composition will be polyetheretherketone (PEEK). Alternatively, the main body may also be comprised of polytetrafluoroethylene (PTFE) or other substances capable of withstanding commonly encountered curing temperatures. The primary function of the tube assembly is to allow the escape of hot air from the mold's interior cavity and to thereby prevent air pressure build up that can cause curing defects.

Structurally, the vent tube assembly resembles a probe-like rod comprising: a large diameter annular top section that resides on the mold exterior; an annular mid-section that is substantially smaller in diameter than the annular top section and that extends downwardly from the bottom annular top section; and an annular bottom section that is slightly smaller in diameter than the annular mid-section and has a length that is considerably longer than the combined length of the annular top and mid-sections of the tube. The annular mid-section makes contact with the mold wall that surrounds and defines the mold vent hole, and the annular bottom section resides in the mold cavity. The innermost tip of the annular bottom section is rounded and hence is dome-like in appearance to prevent plastic raw material or resin from collecting on the end of the annular bottom section.

An elongated central bore is provided through the vent tube assembly's three sections. The central bore, along with a series of counterbores located near the top of the annular top section, provide an air escape passageway. The passageway fluidly communicates with the interior of the mold via a plurality of pore-like holes arranged in a band just above the innermost tip of the vent. To help prevent loss of plastic raw material through the vent tube as the mold rotates and to restrict the flow of hot oven air into the mold cavity, a plurality of beads is included within the length of the passageway that extends through the annular bottom section. The beads are kept in the tube by a perforated top disk and a retaining clip positioned in the annular top section of the vent tube. A principal advantage provided by the vent tube system over conventional systems is elimination of the need to service the vent tube by cleaning and repacking it after every curing cycle.

DETAILED DESCRIPTION OF THE PREFERRED EMBODIMENT

Figure 1:
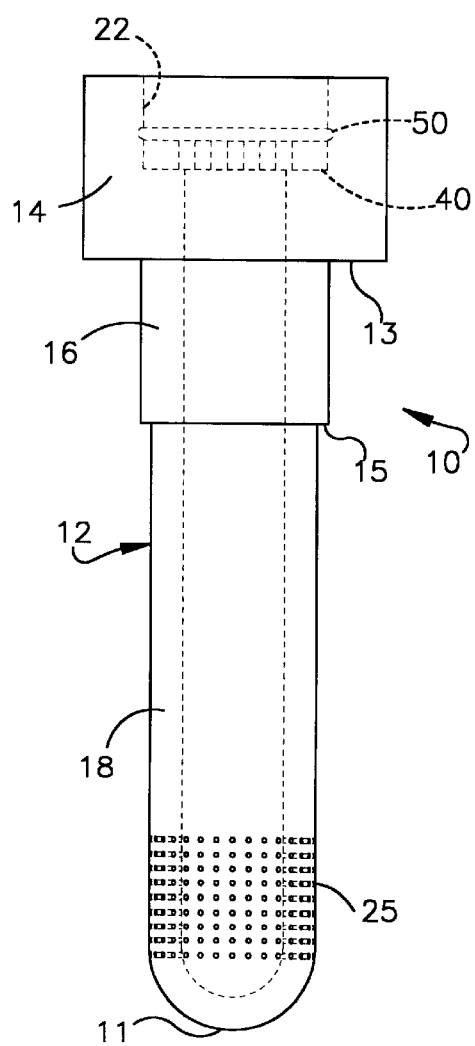
FIG. 1 shows a side view of the vent tube assembly of the present invention.

A vent tube assembly in accordance with a preferred embodiment of the present invention is indicated generally in FIG. 1 by the reference numeral 10. The assembly 10 resembles a probe-like rod comprising: a main tube body 12 having a large diameter annular top section 14 that, when the assembly is in use resides on the mold exterior; an annular mid-section 16 that is substantially smaller in diameter than the annular top section and that extends downwardly from the bottom annular top section 14; and an annular bottom section 18 that is slightly smaller in diameter than the annular mid-section 16 and has a length that is considerably longer than the combined length of the annular top and mid-sections 14 and 16 of the tube. The annular mid-section 16 makes contact with the mold wall (not shown) that surrounds and defines the mold vent hole (not shown), and the annular bottom section resides in the mold cavity. The innermost tip 11 of the annular bottom section is rounded and hence is dome-like in appearance. Where the annular top section 14 and the annular mid-section 16 intersect, a first step-like flange 13 is formed. The flange 13 will abut against the outer wall of the mold and limit movement of the tube assembly 10 into the mold body. A second step-like flange 15 is created where the annular mid-section 16 and the annular bottom section 18 intersect.

Figure 3:
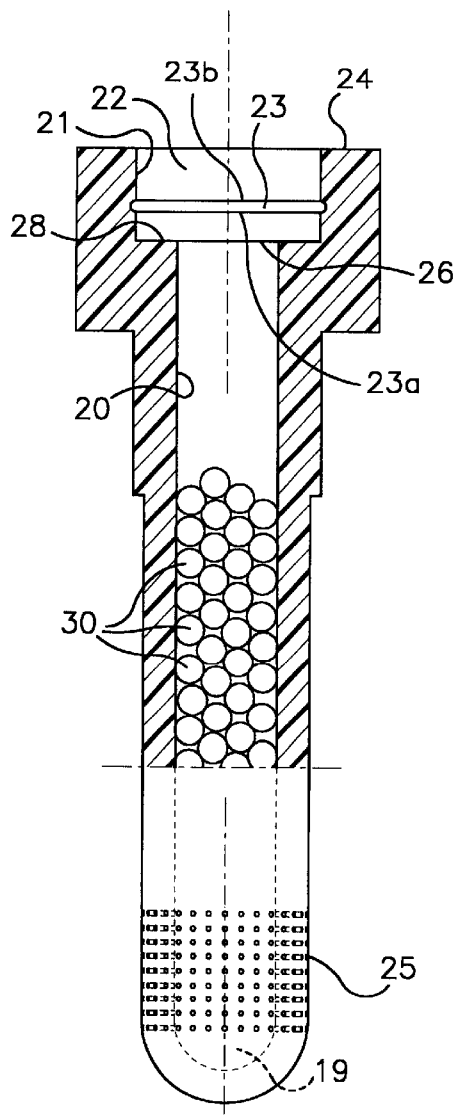
FIG. 3 shows a partial cross-sectional side view of the vent tube assembly of the present invention.

As most clearly shown in FIG. 3, an elongated, longitudinally extending central bore, or central cavity, 20 is provided in the main tube body 12. The central bore 20 stretches from the lower half of the large diameter annular top section 14, through the annular mid-section 16 and within the annular bottom section 18 where the bore 20 ends at the innermost tip 11 in such fashion as to define a hemispherically hollow region 19 within the tip 11. The upper half of the large diameter annular top section 14 is provided with a longitudinally extending central countetbore, or countersunk cavity, 22. The counterbore 22 begins at the top end 24 of the tube body 12 and extends downwardly to the opening 26 of the central bore 20. Where the counterbore 22 and the central bore 20 join one another, a horizontally extending, annular ledge 28 is defined. Within vertical side wall 21 of the counterbore 22, a relatively shallow, thin circumferential groove 23 is provided. Details concerning the purpose of the groove 23 and its location within the counterbore 22 are provided hereinbelow.

Figure 2:
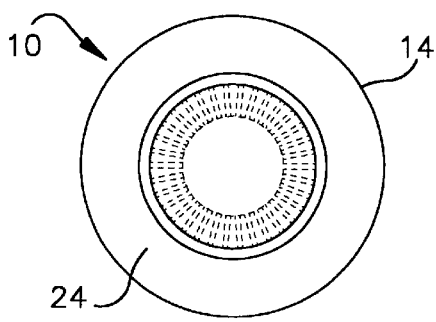
FIG. 2 shows a top view of the vent tube assembly of the present invention.

As shown in FIGS. 1 and 3, annular bottom section 18 is provided with a plurality of small orifices 25 arranged in a band-like configuration. Each of the orifices 25 fully penetrates the wall of bottom section 18 in a direction that is radial relative to the central longitudinal axis of the vent tube assembly 10. The orifices 25 are created by known boring devices and techniques and are preferably arranged in a plurality of equidistantly spaced rows that run horizontally about the periphery of bottom section 18 and that are situated just above the innermost tip 11. Within each row, each of the orifices 25 is spaced apart from one another at equiangular intervals measured radially relative to the central longitudinal axis of the tube assembly 10. (See FIG. 2.)

As shown in FIG. 3, the central bore 20 is provided with a plurality of pellets 30 which are considerably smaller in diameter than the central bore 20. The pellets 30 are preferably comprised of the substance polytetrafluoroethylene (PTFE), and they are loosely contained within the bore 20 and the hemispherically hollow region 19 within the tip 11.

Figure 4:
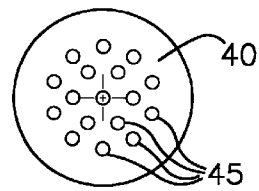
FIG. 4 shows a top view of the top disk employed with the vent tube assembly of the present invention.
Figure 5:
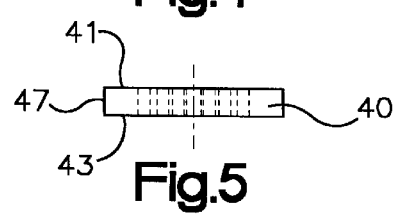
FIG. 5 shows a side cross-sectional view of the disk of the vent tube assembly of the present invention.

Returning to FIG. 1, it will be observed that a disk 40, or disk-like partition, is received by the counterbore 22 provided in the large diameter annular top section 14. The disk 40 has a diameter that is substantially the same as that of the counterbore 22 and a thickness that is considerably less that the depth of the counterbore 22. As may be most clearly seen in FIG. 4, the disk 40 is provided with a plurality of orifices 45 which as shown by FIG. 5 run perpendicularly between the top and bottom faces 41 and 43 of the disk 40. The diameter of each of the orifices 45 will be substantially smaller than the diameter of each of the pellets 30. The disk 40 is received by the counterbore 22 in a manner so that the bottom face 43 of the disk 40 rests flatly upon the annular ledge 28 and the circumferential edge 47 of the disk 40 makes loose contact with the vertical side wall 21 of the counterbore 22.

As shown in FIG. 1, a thin, flexible, ring-like binding clip 50 sets atop the disk 40 and partially within the relatively shallow, thin circumferential groove 23 provided in the vertical side wall 21. The clip 50 is of a known variety of metallic fastening means which when viewed from the top or bottom surface thereof resembles the letter "C". The groove 23 is situated in the counterbore 22 at such a depth that its lower annular surface 23a is substantially at the same level as the top face 41 of the disk 40 when its bottom face 43 rests flatly against the annular ledge 28. The upper annular surface 23b of the groove 23 is above the lower annular surface 23a by a distance which is substantially equal to the thickness of the clip 50. Such location and thickness of the groove 23 enable the ring 50 to secure the disk 40 within the counterbore 22 by way of physical contact made between the bottom annular surface of the ring 50 and the top face 41 of the disk 40 and between the top annular surface of the ring 50 and the upper annular surface 23b of the groove 23. With the disk retained in the counterbore 22 in such manner, the plurality of pellets remain confined within the center bore 20 regardless of the orientation of the vent tube assembly 10.

The main body 12 and the disk 40 of the tube assembly 10 preferably are produced from a thermoplastic substance. The substance polyetheretherketone (PEEK) has been found to be especially well suited for the purpose of the present invention. PEEK has been determined to have superior qualities over PTFE used to produce heretofore known mold vent tubes. As will be recalled, the main body of prior art vent tubes is typically produced by known machining techniques. While PTFE has functioned satisfactorily for most tube production machining operations, it has been found that where more intricate operations are involved, such as the boring process necessary to produce the band-like configuration of the small orifices 25 situated in the annular bottom section 18, PEEK permits better machining results and markedly fewer rejects. Additionally, while vent tubes made from PTFE have been found to be reasonably heat resistant and thus usable for a number of curing cycles, vent tube assemblies of the present invention have been observed to have heat resistant characteristics which are markedly better than those made of PTFE and hence have been found capable of continued use for considerably more curing cycles before a need to replace them arises. In order to prevent a buildup of plastic raw material on the exterior surface of the annular bottom section 18 of the main body 12, a coating of PTFE is applied thereto by known spraying means. Such coating is applied after the turning operation is complete and before boring of the orifices 25 occurs. Preferably, the PTFE coating material will be a substance known as "Stonecoat 6200" produced by E. L. Stone Co. Applications of the PTFE coating need not be limited exclusively to the annular bottom section 18. Overspray onto the exterior of the annular top section 14 and/or the annular mid-section 16 is acceptable.

From the foregoing it should be evident that the central bore 20 along with the counterbore 22 provide an air escape passageway. The passageway fluidly communicates with the interior of the mold via the band-like configuration of orifices 25 situated just above the innermost tip 11. Such communication makes it possible for hot air within the mold to flow through the orifices 25 and into the bore 20. The plurality of pellets 30 contained in the central bore 20 act as a barrier to help prevent loss of elastomeric raw material from the mold cavity. The plurality of orifices 45 provided in the disk 40 permits the hot air that has entered the bore 20 from the interior of the mold to continue its outward travel within the counterbore 22 and to ultimately exit the vent tube assembly 10 and enter the oven chamber.

While the preferred embodiment of the invention has been described above, it will be recognized and understood that various modifications may be made therein and the appended claims are intended to cover all such modifications which may fall within the spirit and scope of the invention.

What is claimed is:

1. A vent tube assembly for use in a vent hole of a mold used with rotational molding apparatus, said assembly comprising:

an elongated, main body having a plurality of orifices;
a plurality of pellets within said main body;
a partition situated in said main body and having a plurality of perforations;
a partition fastening means for retaining said partition within said main body and resulting in retaining said plurality of pellets within said main body;
said vent tube assembly being in communication with a mold cavity for venting the mold.

2. A vent tube assembly as claimed in claim 1, wherein said main body has a top section, a bottom section and an intermediate section between said top section and said bottom section, wherein, said top section, bottom section and intermediate section define a central cavity within said main body.

3. A vent tube assembly as claimed in claim 2, wherein said plurality of orifices are placed within said bottom section.

4. A vent tube assembly as claimed in claim 2, wherein said plurality of pellets are contained within said central cavity.

5. A vent tube assembly as claimed in claim 4, wherein said central cavity is provided with a countersunk cavity situated within said top section of said main body.

6. A vent tube assembly as claimed in claim 5, wherein said top section is provided with a groove formed about the periphery said countersunk cavity.

7. A vent tube assembly as claimed in 6, wherein a ledge is defined along the bottom of said countersunk cavity for placement of said partition.

8. A vent tube assembly as claimed in claim 7, wherein said groove is positioned adjacent an upper surface of said partition.

9. A vent tube assembly as claimed in claim 8, wherein a mechanical fastener is placed within said groove to retain said partition within said countersunk cavity.

10. A vent tube assembly as claimed in claim 2, wherein said bottom section includes a dome-shaped innermost tip having a hemispherically shaped hollow region defined by said central cavity, said innermost tip preventing a resin contained within said mold from accumulating on said bottom section.

11. A vent tube assembly as claimed in claim 10, wherein said plurality of orifices are positioned adjacent said innermost tip.

12. A vent tube assembly as claimed in claim 1, wherein said main body is comprised of a thermoplastic substance.

13. A vent tube assembly as claimed in claim 1, wherein said main body is comprised of polyetheretherketone (PEEK).

14. A vent tube assembly as claimed in claim 1, wherein said plurality of pellets are comprised of polytetrafluorethylene (PTFE).

15. A vent tube assembly as claimed in claim 1, wherein said partition is comprised of polyetheretherketone (PEEK).

16. A vent tube assembly as claimed in claim 1, wherein said main body includes a non-stick coating on the exterior surface thereof.

17. A vent tube assembly as claimed in claim 16, wherein said non-stick coating is a PTFE based coating.

18. A vent tube apparatus for use in a vent hole of a mold used with rotational molding apparatus, said assembly comprising:

an elongated main body having a top section, a middle section and a bottom section, said bottom section provided with a plurality of bottom section orifices;

a plurality of pellets within said main body;

a partition situated within said top section having a plurality of partition perforations;

a partition fastening means for retaining said partition and in turn said plurality of pellets within said main body;

said vent tube being in communication with a rotational mold in a manner that said top section extends from an exterior surface of said mold, said bottom section is disposed within said mold, and said middle section is in connection with a rotational mold.

* * * * *